(12) United States Patent
Hsu et al.

(10) Patent No.: US 11,269,783 B2
(45) Date of Patent: *Mar. 8, 2022

(54) OPERATING METHOD FOR DATA STORAGE DEVICE

(71) Applicant: Silicon Motion, Inc., Jhubei (TW)

(72) Inventors: Hong-Jung Hsu, Jhubei (TW); Chen-Hui Hsu, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 92 days.

This patent is subject to a terminal disclaimer.

(21) Appl. No.: 16/820,749

(22) Filed: Mar. 17, 2020

(65) Prior Publication Data

US 2020/0218667 A1 Jul. 9, 2020

Related U.S. Application Data

(63) Continuation of application No. 15/783,973, filed on Oct. 13, 2017, now Pat. No. 10,649,913.

(30) Foreign Application Priority Data

Nov. 15, 2016 (TW) ................. 105137240

(51) Int. Cl.
*G06F 12/10* (2016.01)
*G06F 12/1045* (2016.01)
(Continued)

(52) U.S. Cl.
CPC ...... *G06F 12/1063* (2013.01); *G06F 12/0246* (2013.01); *G06F 12/1009* (2013.01); *G06F 12/0868* (2013.01); *G06F 2212/1016* (2013.01); *G06F 2212/214* (2013.01); *G06F 2212/313* (2013.01); *G06F 2212/466* (2013.01); *G06F 2212/65* (2013.01); *G06F 2212/657* (2013.01); *G06F 2212/7201* (2013.01)

(58) Field of Classification Search
CPC .... G06F 3/0608; G06F 3/0647; G06F 3/0652; G06F 3/068; G06F 12/0261; G06F 12/0269; G06F 3/0679; G06F 3/0631; G06F 12/02; G06F 3/06
See application file for complete search history.

(56) References Cited

U.S. PATENT DOCUMENTS

| | | | |
|---|---|---|---|
| 9,529,705 B2 * | 12/2016 | Kim | G06F 12/0246 |
| 2016/0342509 A1 * | 11/2016 | Kotte | G06F 12/0246 |
| 2018/0024919 A1 * | 1/2018 | Geml | G06F 3/061 |
| | | | 711/103 |

OTHER PUBLICATIONS

Z. Xu, R. Li and C. Xu, "CAST: A page-level FTL with compact address mapping and parallel data blocks," 2012 IEEE 31st International Performance Computing and Communications Conference (IPCCC), 2012, pp. 142-151.*

(Continued)

*Primary Examiner* — Pierre Miche Bataille

(57) ABSTRACT

An operating method for a data storage device is provided. The operating method includes steps of: dividing a mapping table into a plurality of sub-mapping tables; receiving an access command comprising a data address and a command category; determining whether a target sub-mapping table corresponding to the data address has been cached, wherein the target sub-mapping table is one of the sub-mapping tables; and if false, reading and caching the target sub-mapping table from the sub-mapping tables.

19 Claims, 4 Drawing Sheets

(51) Int. Cl.
    *G06F 12/1009*     (2016.01)
    *G06F 12/02*     (2006.01)
    *G06F 12/0868*     (2016.01)

(56) References Cited

OTHER PUBLICATIONS

Y. Hu et al., "Achieving page-mapping FTL performance at block-mapping FTL cost by hiding address translation," 2010 IEEE 26th Symposium on Mass Storage Systems and Technologies (MSST), 2010, pp. 1-12, doi: 10.1109/MSST.2010.5496970.*

Gao Zhong-yi, Pan Li-yang, Ma Hao-zhi and Liang Feng-bo, "MScache: A buffer management scheme based on page-level address mapping for NAND-flash SSD," 2015 4th International Conference on Computer Science and Network Technology (ICCSNT), 2015, pp. 163-168.*

* cited by examiner

| Slot | #0 | #1 | #2 | #3 | #4 | #5 | #6 | #7 | #8 | #9 | #10 | #11 | #12 | #13 | #14 | #15 |
|---|---|---|---|---|---|---|---|---|---|---|---|---|---|---|---|---|
| Table | #0 | #31 | #32 | #33 | #44 | #45 | #46 | #77 | #78 | #79 | #20 | #21 | #22 | #23 | #24 | #55 |
| Count | 1 | 3 | 3 | 3 | 4 | 4 | 4 | 7 | 7 | 7 | 6 | 6 | 6 | 6 | 6 | 5 |
| Time | 100 | 102 | 104 | 106 | 108 | 110 | 200 | 201 | 202 | 203 | 204 | 300 | 305 | 310 | 315 | 320 |

OPERATING METHOD FOR DATA STORAGE DEVICE

FIELD OF THE INVENTION

The present invention relates to a technique for data storage, and more particularly to an operating method for a data storage device.

BACKGROUND OF THE INVENTION

A data storage device, in particular a data storage device using a non-volatile storage medium, includes a plurality of blocks. Each block includes a plurality of pages, each page is for storing data with at least one storage unit, and the storage unit may be 512 B (byte) or preferably 4 KB. Blocks are also divided into empty blocks (or spare blocks) and non-empty blocks (or in-use blocks) depending on whether data is stored therein or not. For data management and access, the data storage device needs to establish and store a host-to-flash physical address mapping table (H2F table), which is simply referred to as a mapping table in the present invention. When the data storage device is in operation, the mapping table is copied to a dynamic random access memory (DRAM) to increase the efficiency of data management and access. In addition, depending on the size of recorded content, in general the size of a mapping table is $\frac{1}{1000}$ of the data storage capacity of a data storage device. For example, if the size of a data storage device was 256 GB (gigabyte), the size of the corresponding mapping table would be 256 MB (megabyte) for storing a complete mapping table and system data, parameters or programs required for operation of the data storage device.

For a data storage device that is only provided with a small-sized DRAM or static random access memory (SRAM) (i.e., the DRAM or SRAM is not large enough to store an entire mapping table), there is a technical need for efficiently using the provided small-sized DRAM or SRAM for data management and access.

SUMMARY OF THE INVENTION

An objective of the present invention is to provide an operating method for a data storage device that enables the data storage device to efficiently utilize its small-sized DRAM or SRAM for data management and access.

The present invention provides an operating method for a data storage device. The operating method includes steps of: dividing a mapping table into a plurality of sub-mapping tables; receiving an access command comprising a data address and a command category; determining whether a target sub-mapping table corresponding to the data address has been cached, wherein the target sub-mapping table is one of the sub-mapping tables; and if false, reading and caching the target sub-mapping table from the sub-mapping tables.

The present invention further provides an operating method for a data storage device. The operating method includes steps of: dividing a mapping table into a plurality of sub-mapping tables, wherein a portion of the sub-mapping tables are a plurality of cached sub-mapping tables and recorded in a cache table; receiving an access command comprising a data address and a command category; determining whether a target sub-mapping table corresponding to the data address is one of the cached sub-mapping tables according to the cache table; and if false, reading and using the target sub-mapping table to replace one of the cached sub-mapping tables and updating the cache table.

In summary, because the mapping table is divided into a plurality of sub-mapping tables, the sub-mapping tables can be separately stored in the DRAM. As a result, the control unit of the data storage device can read and cache the sub-mapping table in the DRAM and then manage data according to the sub-mapping table. In addition, an improved method is also provided for management of the sub-mapping table, so that the present invention improves the efficiency of the data storage device.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
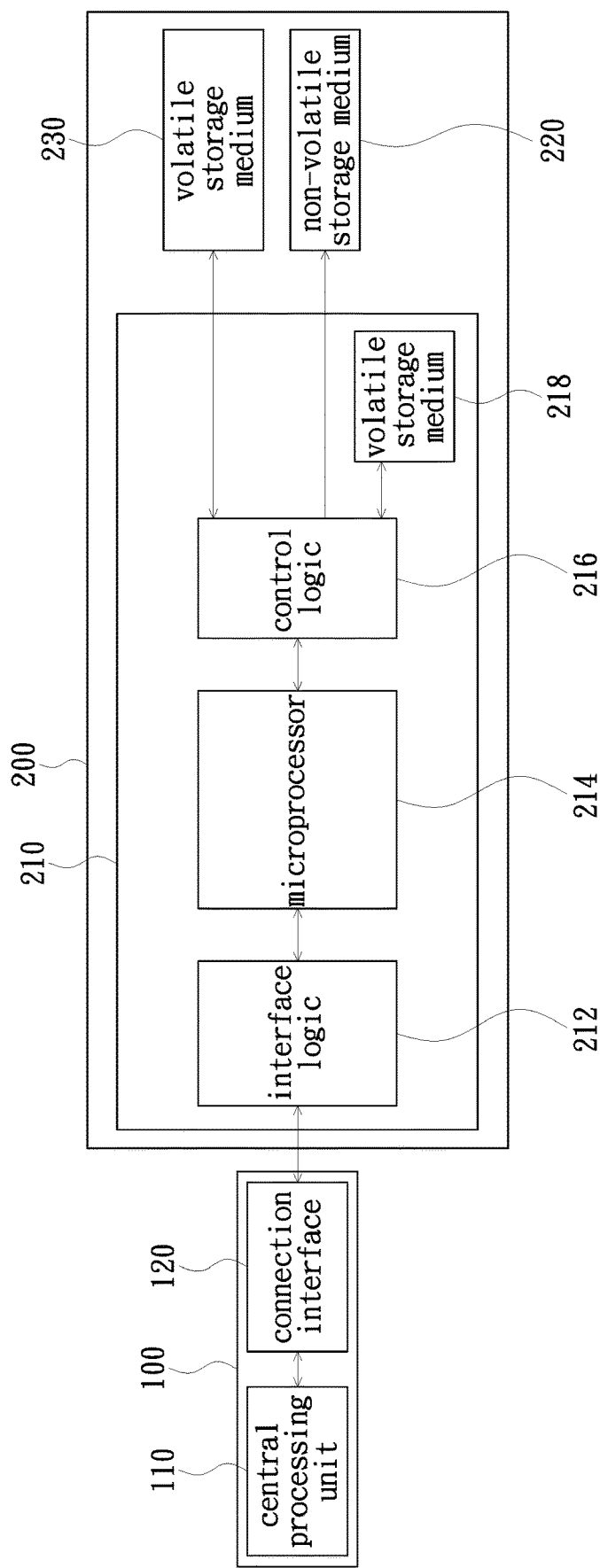
FIG. 1 depicts a data storage device in accordance with an embodiment of the present invention and its electrical coupling relationship with a host.

FIG. 1 depicts a data storage device in accordance with an embodiment of the present invention and its electrical coupling relationship with a host. Referring to FIG. 1, the host 100 mainly includes a central processing unit 110 and a connection interface 120. The connection interface 120 is adapted to electrically couple the data storage device 200 of the present embodiment. The central processing unit 110 is configured to transmit commands and data to the data storage device 200 via the connection interface 120. For example, the central processing unit 110 transmits a read command to the data storage device 200, or transmits a write command and data to be written into the data storage device 200 to the data storage device 200. In the present embodiment, the host 100 is implemented as a computer, a mobile phone, a tablet computer, a camera or other handheld electronic device having computing functions.

The data storage device 200 mainly includes a control unit 210 and a non-volatile storage medium 220 and a volatile storage medium 230. The control unit 210 is electrically coupled to the non-volatile storage medium 220 and the volatile storage medium 230 and is configured to control the operation (e.g., data access or data erase) of the non-volatile storage medium 220 and the volatile storage medium 230. In the present embodiment, the volatile storage medium 230 is implemented by, for example, dynamic random access memory (DRAM) or static random access memory (SRAM), and the non-volatile storage medium 220 is, for example, a flash memory, a magnetoresistive random access memory (RAM), a ferroelectric RAM or a resistive RAM (RRAM) capable of long-term data storage.

The control unit 210 mainly includes an interface logic 212, a microprocessor 214, a control logic 216 and a volatile storage medium 218, wherein the volatile storage medium 218 is implemented by, for example, register, SRAM or DRAM. The capacity of the storage medium 218 is preferably less than the capacity of the volatile storage medium 230. The microprocessor 214 of the control unit 210 is electrically coupled to the interface logic 212 and the control logic 216. The control logic 216 is electrically coupled to the volatile storage medium 218, the volatile storage medium 230 and the non-volatile storage medium 220. The microprocessor 214 is configured to access data in the volatile storage medium 218, the volatile storage medium 230 and the non-volatile storage medium 220 via the control logic 216. Further, the microprocessor 214 is configured to receive commands or data from the host 100 via the interface logic 212, wherein the aforementioned commands are, for example, a write command, a read command or a flush command.

In the following description, the present invention will be described based on the following parameters, but the present invention is not limited thereto. The non-volatile storage medium 220 has a capacity of 256 GB, which is for storing not only the data from the host 100 but also the mapping table, confidential data, protection data, and the like. The size of the mapping table is equal to $\frac{1}{1,000}$ of the capacity of the non-volatile storage medium 220; therefore, the mapping table has a size of 256 MB. The size of each record of the mapping table is 4 B, so the mapping table can contain 64,000,000 records. The volatile storage medium 230 is preferably a DRAM with a capacity of 1 MB, which is insufficient to store an entire mapping table. The volatile storage medium 218 is preferably a SRAM with a capacity of 128 KB, which is smaller than the capacity of the volatile storage medium 230.

Figure 2:
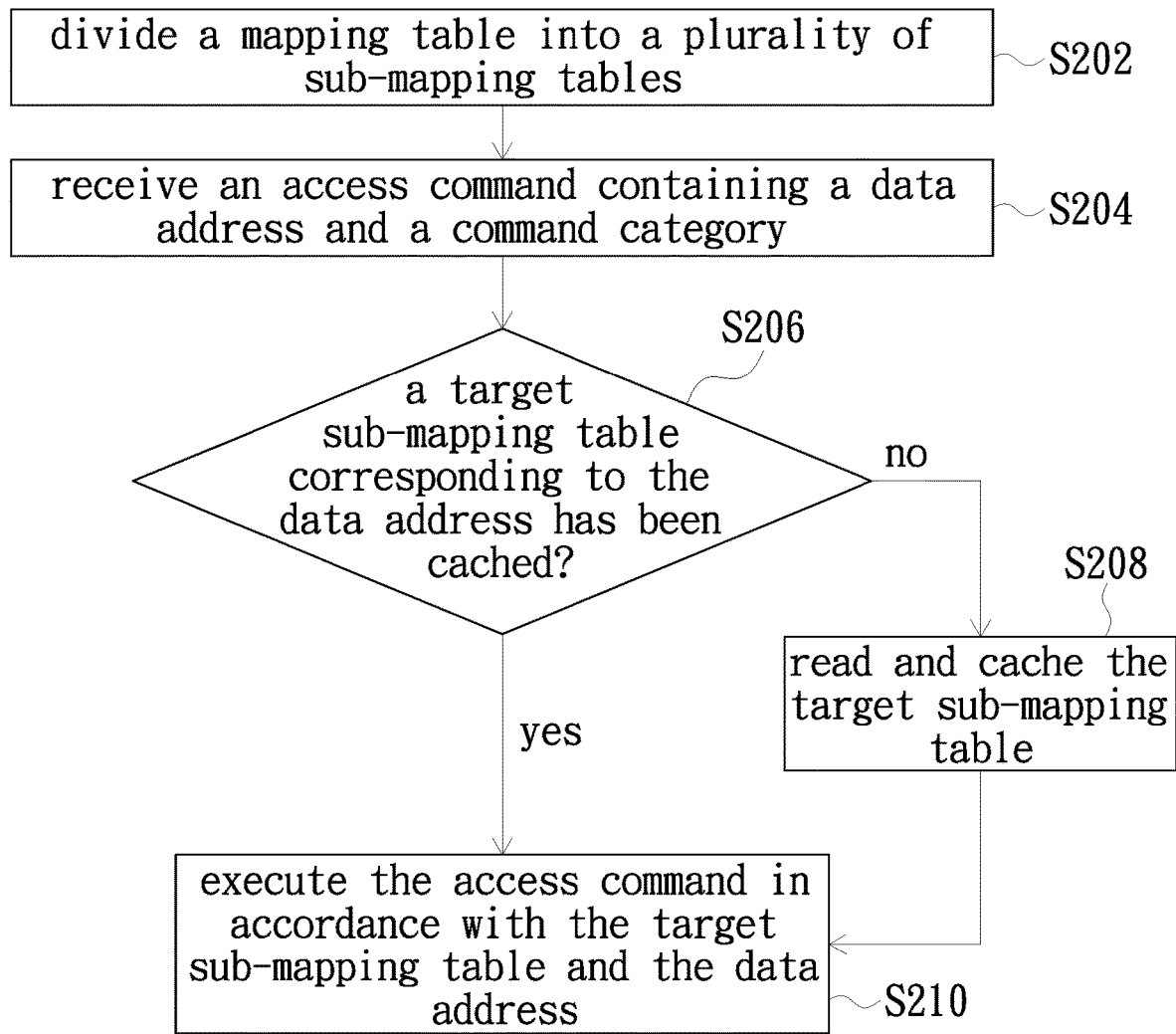
FIG. 2 is a flow chart of an operating method of a data storage device in accordance with an embodiment of the present invention.

FIG. 2 is a flow chart of an operating method of a data storage device in accordance with an embodiment of the present invention. Please refer to FIGS. 1 and 2. As shown, first, step S202: dividing a mapping table into a plurality of sub-mapping tables. The mapping table is preferably established in accordance with the order of logical block addresses (LBA) as an index. Or, the mapping table is preferably established in units of an interval (for example, interval of 65,536 LBAs); wherein it is to be noted that the LBA may be established in accordance with the order of values of LBAs or the order of data reception within the unit. The volatile storage medium 218 has a capacity of 128 KB and is designed to store two sub-mapping tables, wherein each sub-mapping table has a size of 64 KB. Therefore, the mapping table is divided in units of 64 KB and can be divided into 4,000 sub-mapping tables, which are sub-mapping tables #0 to #3999. Each sub-mapping table is capable of storing 16,384 records.

Thereafter, step S204: receiving an access command containing a data address and a command category. Specifically, the control unit 210 may receive an access command from the host 100, wherein the access command includes a data address. The data address is preferably a value, e.g., an LBA. Or, the data address may be two values, e.g., the first LBA and the second LBA representing the start point and end point of data, respectively, or an LBA and a quantity representing the start point of data and the total number of records of data, respectively. The command category indicates the type of the access command, for example, a read, a write, a dump, or an erase command. For example, the access command is for reading the data at the data address.

Thereafter, step S206: determining whether a target sub-mapping table corresponding to the data address has been cached. If the determination result is true, step S210 is performed. If the determination result is false, step S208 is performed. The target sub-mapping table is one of the sub-mapping tables. Assuming the data address is LBA10000 and a sub-mapping table can store 16,384 records. Since the quotient of dividing 10,000 by 16,384 is 0, the target sub-mapping table corresponding to LBA10000 is sub-mapping table #0. If the sub-mapping table #0 is already stored in the volatile storage medium 230 or the volatile storage medium 218, the target sub-mapping table is cached; alternatively, if the sub-mapping table #0 is not stored in the volatile storage medium 230 or the volatile storage medium 218, the target sub-mapping table is not cached.

Figure 3:
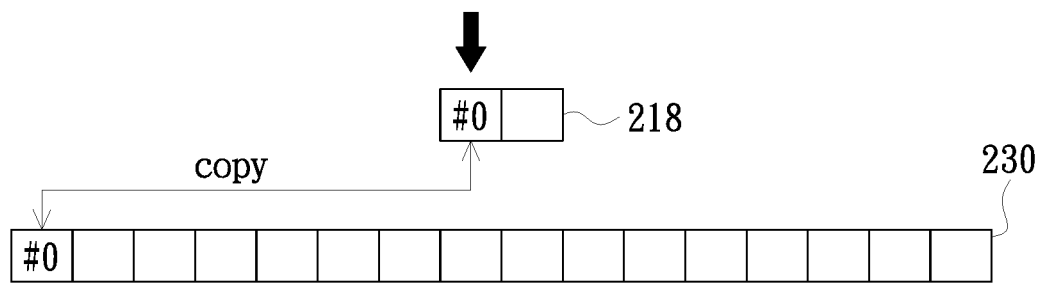
FIG. 3 depicts storing the sub-mapping table #0 in the volatile storage medium 230 and the volatile storage medium.

Thereafter, step S208: reading and caching the target sub-mapping table. Specifically, since the sub-mapping table #0 is not stored in the volatile storage medium 230 or the volatile storage medium 218, the control unit 210 reads the sub-mapping table #0 from the non-volatile storage medium 220, stores the sub-mapping table #0 in the volatile storage medium 218 and copies (or caches) the sub-mapping table #0 to the volatile storage medium 230. As shown in FIG. 3, the sub-mapping table #0 is stored (copied) in the volatile storage medium 230 and the volatile storage medium 218. Then, step S210 is performed.

Thereafter, step S210: executing the access command in accordance with the target sub-mapping table and the data address. Specifically, since the sub-mapping table #0 is already stored in the volatile storage medium 230 or the volatile storage medium 218, the control unit 210 finds the data corresponding to LBA10000 in accordance with the block serial number and the page serial number of the LBA10000 in the sub-mapping table #0 and executes the access command to read the data corresponding to LBA10000. The operating method of the data storage device of the present invention is then ended.

Figure 4:
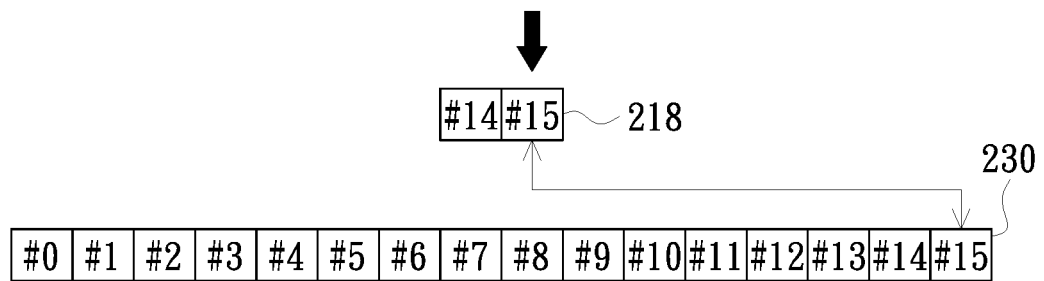
FIG. 4 depicts the volatile storage medium caching 16 sub-mapping tables.
Figures 5, 6:
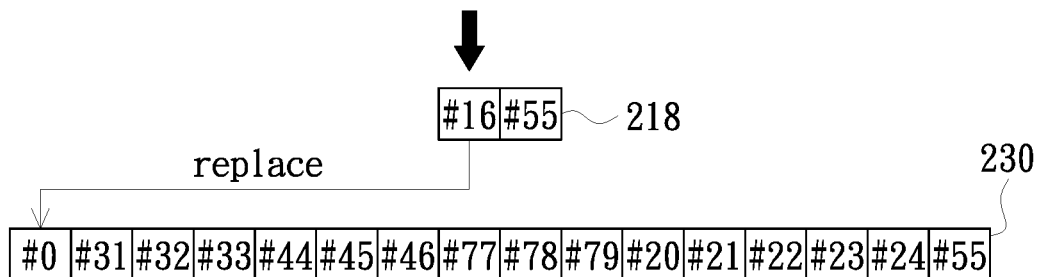
FIG. 5 is a cache table in accordance with an embodiment of the present invention.
FIG. 6 depicts that the sub-mapping table #0 is replaced by the sub-mapping table #16 and the sub-mapping table #16 is stored in the volatile storage medium.

When the operating method of the data storage device of the present invention is performed for a period of time, the volatile storage medium 230 caches 16 sub-mapping tables (e.g., sub-mapping tables #0 to #15), as shown in FIG. 4. At this time, there is another technical requirement on how to manage the volatile storage medium 230 efficiently. In another embodiment of the present invention, the step S202 is changed to: dividing a mapping table into a plurality of sub-mapping tables, wherein some of the sub-mapping tables are already cached in the volatile storage medium 230 and are referred to as a plurality of cached sub-mapping tables, and the cached sub-mapping tables are recorded in a cache table. Step S206 is changed to: determining whether the target sub-mapping table corresponding to the data address is one of the cached sub-mapping tables according to the cache table. Step S208 is changed to: reading and using the target sub-mapping table to replace one of the cached sub-mapping tables and updating the cache table. The replaced cached sub-mapping table has the lowest read count or the earliest cache time among the cached sub-mapping tables. As shown in FIG. 5, in order to use the space of the volatile storage medium 230 efficiently, the control unit 210 preferably establishes a cache table for recording the slot serial numbers of the volatile storage medium 230 and the data corresponding to the serial numbers of the cached sub-mapping tables, or even some information such as the read count or cache time of each cached sub-mapping table. The sub-mapping table #0 recorded in the slot #0 has the lowest read count (e.g., 1) or the earliest cache time (e.g., 100) in all of the cached sub-mapping tables. As shown in FIG. 6, assuming that the target sub-mapping table is sub-mapping table #16 at this time and since the volatile storage medium 230 has no space for storing the sub-mapping table #16, the control unit 210 may directly use the sub-mapping table #16 to replace any of the cached sub-mapping tables (e.g., sub-mapping table #33), store the sub-mapping table #16 in the slot (i.e., slot #3) where the sub-mapping table #33 is stored, and update the cache table. Alternatively, since the sub-mapping table #0 has the lowest read count (e.g., 1) or the earliest cache time (e.g., 100) in all of the cached sub-mapping tables, the control unit 210 determines to replace the sub-mapping table #0 with the sub-mapping table #16 and stores the sub-mapping table #16 in the slot (i.e., slot #0) where the sub-mapping table #0 is stored. In the end, the serial number (e.g., 16), the read count (e.g., 0) and the cache time (e.g., 400) of the sub-mapping table #16 are updated to the slot #0 of the cache table.

After the target sub-mapping table is cached to the volatile storage medium 230, the control unit 210 still needs to copy the target sub-mapping table from the volatile storage medium 230 to the volatile storage medium 218 if the control unit 210 is to access the target sub-mapping table. Because the time required for copying the target sub-mapping table from the volatile storage medium 230 to the volatile storage medium 218 is much less than the time required for reading the target sub-mapping table from the non-volatile storage medium 220, caching the target sub-mapping table to the volatile storage medium 230 can significantly improve the performance of the data storage device 200.

In summary, because the mapping table is divided into a plurality of sub-mapping tables, the sub-mapping tables can be separately stored in the DRAM. As a result, the control unit 210 of the data storage device 200 can read and cache the sub-mapping table in the DRAM and then manage data according to the sub-mapping table. In addition, an improved method is also provided for the management of the sub-mapping table, so that the present invention improves the efficiency of the data storage device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An operating method for a data storage device including a control unit, a non-volatile storage medium, and a volatile storage medium, comprising:
    dividing a mapping table stored in the non-volatile storage medium of the data storage device into a plurality of sub-mapping tables, and storing the plurality of sub-mapping tables in the non-volatile storage medium of the data storage device and caching some of the plurality of sub-mapping tables in the volatile storage medium of the data storage device;
    receiving an access command comprising a data address and a command category, wherein the data address comprises at least one logical block address, and the at least one logical block address indicates a start point of data;
    determining whether a target sub-mapping table corresponding to the data address has been cached, wherein the target sub-mapping table is one of the sub-mapping tables;
    if false, reading and caching the target sub-mapping table from the sub-mapping tables to the volatile storage medium of the data storage device; and
    copying the target sub-mapping table from the volatile storage medium of the data storage device to a volatile storage medium of the control unit when accessing the target sub-mapping table.

2. The operating method according to claim 1, further comprising:
    executing the access command according to the target sub-mapping table and the data address.

3. The operating method according to claim 1, wherein the mapping table is established in accordance with an order of logical block addresses as an index.

4. The operating method according to claim 1, wherein the mapping table is in units of an interval and established in accordance with an order of values of logical block addresses within each of the units.

5. The operating method according to claim 1, wherein the mapping table is in units of an interval and established in accordance with an order of data reception within each of the units.

6. The operating method according to claim 1, wherein the data address comprises a logical block address.

7. The operating method according to claim 1, wherein the data address comprises a first logical block address and a second logical block address.

8. The operating method according to claim 1, wherein the data address further comprises a quantity, and the quantity indicates a total number of records of data.

9. An operating method for a data storage device including a control unit, a non-volatile storage medium, and a volatile storage medium, comprising:
    dividing a mapping table stored in the non-volatile storage medium of the data storage device into a plurality of sub-mapping tables, and storing the plurality of sub-mapping tables in the non-volatile storage medium of the data storage device, and caching a portion of the sub-mapping tables in the volatile storage medium of the data storage device, and the portion of the sub-mapping tables is a plurality of cached sub-mapping tables and recorded in a cache table;
    receiving an access command comprising a data address and a command category, wherein the data address comprises at least one logical block address, and the at least one logical block address indicates a start point of data;
    determining whether a target sub-mapping table corresponding to the data address is one of the cached sub-mapping tables according to the cache table;
    if false, reading and using the target sub-mapping table to replace one of the cached sub-mapping tables and updating the cache table; and
    copying the target sub-mapping table from the volatile storage medium of the data storage device to a volatile storage medium of the control unit when accessing the target sub-mapping table.

10. The operating method according to claim 9, further comprising:
    executing the access command according to the target sub-mapping table and the data address.

11. The operating method according to claim 9, wherein a read count of the replaced cached sub-mapping table that is replaced by the target sub-mapping table is a point value among the read counts of the cached sub-mapping tables.

12. The operating method according to claim 9, wherein a cache time of the replaced cached sub-mapping table is a point value among the cache times of the cached sub-mapping tables.

13. The operating method according to claim 9, wherein the cache table comprises data for recording a slot serial number of a volatile storage medium and a serial number of the cached sub-mapping tables.

14. The operating method according to claim 13, wherein the cached table further comprises at least one of the read counts or cache times of the cached sub-mapping tables.

15. The operating method according to claim 9, wherein the mapping table is established in accordance with an order of logical block addresses as an index.

16. The operating method according to claim 9, wherein the mapping table is in units of an interval and established in accordance with an order of values of logical block addresses within each of the units.

17. The operating method according to claim 9, wherein the mapping table is in units of an interval and established in accordance with an order of data reception within each of the units.

18. The operating method according to claim 9, wherein the data address comprises a first logical block address and a second logical block address.

19. The operating method according to claim 9, wherein the data address further comprises a quantity, and the quantity indicates a total number of records of data.

\* \* \* \* \*